United States Patent

[11] 3,607,031

| [72] | Inventors | Filippo Barilli;<br>Giorgio Cozza; Luigi Lugo, all of Milan, Italy |
|---|---|---|
| [21] | Appl. No. | 792,162 |
| [22] | Filed | Jan. 17, 1969 |
| [45] | Patented | Sept. 21, 1971 |
| [73] | Assignee | Societa Italiana Resine S.p.A.<br>Milan, Italy |
| [32] | Priority | Jan. 27, 1968 |
| [33] | | Italy |
| [31] | | 12065A/68 |

[54] PROCESS FOR PURIFYING AND CONCENTRATING AQUEOUS SOLUTIONS OF PHOSPHORIC ACID
2 Claims, No Drawings

[52] U.S. Cl. .................................................. 23/165
[51] Int. Cl. .................................................. C01b 25/22
[50] Field of Search .................................. 23/165, 165 B, 165 D

[56] References Cited
UNITED STATES PATENTS

| 2,611,681 | 9/1952 | Bellinger | 23/165 |
|---|---|---|---|
| 3,073,677 | 1/1963 | Malley et al. | 23/165 |
| 3,481,700 | 12/1969 | Legal et al. | 23/165 |

Primary Examiner—Oscar R. Vertiz
Assistant Examiner—Gregory A. Heller
Attorney—Sughrue, Rothwell, Mion, Zinn & Macpeak ABSTRACT: A process for purifying and concentrating aqueous solutions of phosphoric acid which comprises:

a. mixing an aqueous solution having a $P_2O_5$ content lower than 25 percent by weight and a calcium sulfate content, expressed as $CaSO_4 \cdot 2H_2O$ of from 1.4–1.8 percent by weight with an aqueous solution having a $P_2O_5$ content of from 52 to 54 percent by weight and a sulfate ion content lower than 0.5 percent by weight, such that the resulting solution has a $P_2O_5$ content ranging between 25 percent and 40 percent by weight, b. bringing the temperature of said resulting solution to within a range of from 30° to 40° C., in order to effect precipitation of the calcium sulfate as the dihydrate, c. separating said calcium sulfate dihydrate from the solution, d. concentrating said solution by evaporating water at a pressure of from 100 to 150 mm.Hg and a temperature ranging from 80° to 90°C., to a $P_2O_5$ content of 50 to 54 percent by weight, and e. recycling a fraction of the solution obtained from step (d) to step (a),
said solution having a final sulfate ion content of below 0.5 percent.

PROCESS FOR PURIFYING AND CONCENTRATING AQUEOUS SOLUTIONS OF PHOSPHORIC ACID

The invention relates to a process for purifying and concentrating aqueous solutions of phosphoric acid partly in salt form so as to obtain solutions having a $P_2O_5$ concentration exceeding 40 percent by weight.

These solutions are particularly suitable for preparing alkali phosphates useful in the formulation of detergent compositions.

It is known that by treating finely subdivided mineral phosphates with aqueous sulfuric acid in the hot, the sulfuric acid being in excess over the stoichiometric quantity required for setting free the phosphoric acid, an aqueous phosphoric acid solution is obtained which is contaminated by the presence of fluosilicic acid, sulfuric acid as well as small quantities of iron, aluminum, vanadium, arsenic, calcium, magnesium compounds and organic substances.

In a previous application, we have disclosed a process for removing from such solutions the excess sulfuric acid in the form of calcium sulfate and fluosilicic acid in the form of sodium fluosilicate, by adding the stoichiometric quantity of phosphorites (phosphate rock) and an excess of sodium phosphates, preferably in an aqueous solution. In this precipitation the atomic ratio Na/F is between 1/1 and 2.5/1, whereby the resulting solutions are partly in salt form.

On account especially of the appreciable solubility of calcium sulfate in phosphoric solutions obtained after separation of most of the main impurities, the sulfate ion content in the latter, notwithstanding the initial separation, is too high for the solutions to be employed in the preparation of high purity alkali phosphates suitable for detergents. It is known to remove this residual quantity of sulfate ion by adding barium carbonate to the solution and filtering after a certain ageing period. The operation is objectionable for various reasons, especially because of the considerable cost of the reagent and unsatisfactory separation of the precipitate. On subsequent concentration of the solution the reactor walls are considerably fouled with precipitate and a heavy loss of time is involved in cleaning them.

It has now been found that, without adding any specific substance for precipitating the residual sulfate ions present but by carrying out a particular two-step concentration of phosphoric solutions of a concentration not exceeding about 25 percent, the drawbacks of the prior art are avoided and phosphoric acid solutions are obtained which are of high purity and high $P_2O_5$ concentration.

The process of the invention consists in bringing about a first increment in $P_2O_5$ concentration by admixing a solution having a $P_2O_5$ content not exceeding 25 percent with a further phosphoric solution of higher $P_2O_5$ concentration, and preferably then lowering the temperature. This precipitates most of the sulfate ions in the form of calcium sulfate which is filtered off.

A further $P_2O_5$ increment is then affected by evaporation in vacuuo to bring the solution to the desired concentration of at least 40 percent $P_2O_5$.

This procedure is explained by the fact that the solubility of sulfates, more particularly calcium sulfate, is affected both by temperature, in that it decreases with a fall in temperature and, above all, by the $P_2O_5$ concentration in the solutions, in the sense that on increase in $P_2O_5$ concentration the sulfate solubility rises up to a $P_2O_5$ concentration of 18 to 22 percent, whereafter it falls considerably.

The decrease in solubility of calcium sulfate and increment in $P_2O_5$ concentration could more easily be obtained by distilling the phosphoric solutions or lowering the temperature, during which the sulfate would precipitate in part, followed by distillation of the resulting phosphoric solution.

However, such process is seriously objectionable due to the considerable fouling of the walls of the exchangers which occurs by the precipitated calcium sulfate, which fouling gradually increases with time and requires frequent stoppages in order to clean the reactors, with a considerable loss of time. The further procedure is difficult to carry out, in that operational difficulties, more particularly in connection with filtering, prevent a decrease in temperature as required for a fair precipitation of the sulfate, which is why in the subsequent evaporation considerable quantities of sulfate which lead to fouling are still present.

The process of the invention avoids the above drawbacks, in that the first increment in $P_2O_5$ reduces the quantity of dissolved calcium sulfate to values such that on the subsequent evaporation in vacuum no fouling occurs.

By the process of the invention the sulfate and fluosilicate ions precipitate, in the solution obtained after the treatment of the mineral phosphate with sulfuric acid, in the form of calcium sulfate and sodium fluosilicate, respectively. Precipitation is carried out separately or simultaneously according to the fluorine content of the phosphatic rock, by adding the stoichiometric quantity of phosphorites in respect of the sulfate ion and an excess mono- and/or plurisodium phosphate solution in respect of the fluosilicate ion, the mono- and/or plurisodium phosphates being employed alone or jointly.

The resulting solution having a $P_2O_5$ content not exceeding 25 percent is admixed with a given quantity of phosphoric acid solution preferably having a higher $P_2O_5$ content, whereafter small quantities of calcium sulfate crystals are preferably added to improve precipitation, the solution is allowed to age for a certain period, e.g. 2 hours, at a predetermined temperature, preferably 30° to 45° C., and the precipitate is filtered off.

The solution resulting from the intermixing is brought preferably to a temperature between 30° and 45° C. A temperature below 30° C. is not advisable on account of the difficulties encountered in filtering off the calcium sulfate.

By subsequently distilling in vacuum, the solution is brought to the desired $P_2O_5$ content. Preferably evaporation is carried out at a pressure of between 100 and 150 mm. Hg, at a temperature of approximately 80° to 90° C.

The solutions thus obtained are of a high $P_2O_5$ content, exceeding 40 percent, equaling or exceeding 50 percent, preferably 50 to 54 percent by weight, and have a smaller quantity of impurities present than in solutions prepared by conventional processes. The solutions are essentially pure, their sulfate ion content being below 0.5 percent, so that they are particularly suitable for the formulation of detergent compositions.

The process of the invention can be carried out continuously, as follows. Part of the solution from the evaporation, which has a $P_2O_5$ content preferably between 50 and 54 percent, is recycled to the solution from which the phosphate and fluosilicate have been precipitated in a quantity such as to bring the $P_2O_5$ content of the resulting solution to between 25 and 40 percent, preferably to around 35 percent. The remainder of the solution is e.g., utilized for preparing alkali polyphosphates.

The following examples illustrate the invention.

Example 1

150 kg. of a raw solution of specific gravity 1.212, obtained by treating a phosphorite with sulfuric acid, and of the following composition:

| | | | |
|---|---|---|---|
| $P_2O_5$ | 22.3% | MgO | 0.15% |
| $SO_4^{2-}$ | 1.8% | $Al_2O_3$ | 0.2% |
| $F^1$ | 0.7% | $Fe_2O_3$ | 0.5% |
| CaO | 0.2% | V | 170 p.p.m. |
| $SiO_2$ | 0.5% | As | 80 p.p.m. | was admixed at 70° C., with stirring, with 2.7 kg. ground and sieved phosphorites containing 50.8% CaO, 32.6% $P_2O_5$ and 2.9% $F^1$, and with 7.5 kg. anhydrous calcium sulfate.

A suspension was thus obtained which was aged for 5 hours at 20° C., and then filtered at the same temperature.

The resulting solution was heated to 70° C. and was admixed with 12 kg. of an aqueous solution containing 50 weight percent of sodium phosphates, the Na/P ratio being about 2/1.

The fluosilicates precipitated in the form of small crystals which were filtered off at 70° C., washed with lukewarm water, then dried, yielding approximately 1,845 g. of 98 percent sodium fluosilicate. After the filtering the solution was cooled down to 35° C. and, after adding 30 g. calcium sulfate crystals thereto, was allowed to stand to precipitate 910 g. of calcium sulfate dihydrate, which was filtered off. The filtrate was placed into an evaporating chamber of an exchanger and concentrated to a volume of 60 percent by operating in vacuum at 100 mm. Hg and at 80° C. Calcium sulfate dihydrate formed on the walls of the exchanger increasingly with time.

The solution was then freed from the smaller quantity of further impurities present and its final $P_2O_5$ content was about 852 g./liter, the sulfate ion content amounting to about 0.4 percent.

Example 2

A raw solution of the same composition as in example 1 was subjected to separate precipitations of the calcium sulfate and sodium fluosilicate in the manner described above.

150 kg. of the resulting solution containing 24.2% and 1.4% $P_2O_5$ and calcium sulfate dihydrate respectively, was admixed at 80° C. with 197.5 kg. of a solution containing 52% and 0.3% of $P_2O_5$ and sulfate, respectively, which had been obtained at the final step of the process after concentration and purification. The resulting solution containing about 40% $P_2O_5$ was admixed with 70 g. calcium sulfate and slowly heated to 35° C. and allowed to stand for 2 hours.

Approximately 1,600 g. of calcium sulfate dihydrate was precipitated and filtered off. After filtering, the solution was conveyed to an exchanger and subjected to distillation at 80° C. and 100 mm. Hg to a volume of about 30 percent.

No fouling by calcium sulfate was ascertained on the walls of the exchanger. The resulting product was admixed with 150 g. coal dust, 25 g. pig iron and 300 g. sodium sulfide, the temperature being maintained at 80° C. for 30 minutes. A solution was filtered off, which was substantially free of traces of any organic substances present in the initial raw solution, containing about 860 g. $P_2O_5$ per liter equaling 52% by weight solution, the sulfate ion still present amounting to only 0.3 percent, so that the solution was particularly suitable for preparing sodium tripolyphosphate of high purity, as required for the formulation of detergent compositions.

The solution was recycled in part in order to concentrate the initial $P_2O_5$ solution; the remainder was neutralized by means of 50% NaOH, whereby the sulfuric acid solution partly in salt form was separated by precipitation from impurities still present, such as V, Ca, Fe, Al and Mg, which were subsequently removed by filtering.

Example 3

This example was carried out in the same manner as example 2. 150 kg. of the 24.2% $P_2O_5$ solution containing 1.4 percent calcium sulfate dihydrate was concentrated to a $P_2O_5$ content of 35 percent by recycling 95.3 kg. of a 52% $P_2O_5$ solution, the operation being carried out at 80° C. After adding 90 g. calcium sulfate the temperature was raised to 35° C. and the solution was allowed to stand for 2 hours.

Approximately 1,150 g. of calcium sulfate dihydrate were precipitated and filtered off. Distillation was then carried out at 80° C. and 150 mm. Hg to a volume of 40 percent. No fouling by calcium sulfate on the exchanger walls was noticed.

The resulting product is treated in the manner described in example 2 to obtain a solution containing approximately 52 percent and 0.4 percent by weight of $P_2O_5$ and sulfate ions, respectively.

Example 4

The same solution and the same manner of operation as in example 3 was adopted. The only difference consisted in heating the solution after concentration by recycling the final solution to a temperature of 30° C. instead of 35° C. Approximately 1,270 g. of calcium sulfate dihydrate was precipitated. During subsequent distillation at 100 mm. Hg and 80° C. no fouling of the exchanger walls by calcium sulfate was noticed. The final solution contained approximately 52 percent of $P_2O_5$ and 0.3 percent of sulfate ions.

Example 5

150 kg. of a raw solution, of specific gravity 1.238, were obtained by treating a fluorine-poor phosphorite with sulfuric acid; the solution contained approximately 23.6% $P_2O_5$, 1.5% $SO_4^{11}$ and 0.15% $F^1$, and was admixed at 70° C., while stirring, with (a) 2.5 kg. of ground and sieved phosphorites containing 51.6% CaO, 32.8% $P_2O_5$ and 2.45% $F^1$, (b) 7.5 kg. anhydrous calcium sulfate and (c) 3.2 kg. of a solution containing 50 percent by weight sodium phosphates wherein the ratio Na/P was about 2/1. A suspension was obtained, which was aged for 5 hours at 20° C., and then filtered at the same temperature.

The resulting solution was admixed with 102 kg. of the s solution containing 50% $P_2O_5$ and 0.75 percent sulfate, obtained at the final step of the process after concentration and purification. The solution now formed, containing about 35 percent of $P_2O_5$, was slowly heated after adding 70 g. calcium sulfate thereto to a temperature of 35° C. and allowed to stand for 2 hours. About 1,400 g. of calcium sulfate dihydrate was precipitated and filtered off. The filtrate was conveyed to an exchanger and distilled at 80° C. and 110 mm. Hg down to a volume of 40 percent approximately. No fouling of the exchanger wall by calcium sulfate was seen. The resulting product was then treated in the manner described in example 2 and a solution containing 50% $P_2O_5$ and 0.4 percent sulfate ions was obtained.

We claim:
1. A process for purifying and concentrating aqueous solutions of phosphoric acid which comprises:
   a. mixing an aqueous solution having a $P_2O_5$ content lower than 25 percent by weight and a calcium sulfate content, expressed as $CaSO_4 \cdot 2H_2O$ of from 1.4–1.8 percent by weight with an aqueous solution having a $P_2O_5$ content of from 52 to 54 percent by weight and a sulfate ion content lower than 0.5 percent by weight, such that the resulting solution has a $P_2O_5$ content ranging between 25 percent and 40 percent by weight,
   b. bringing the temperature of said resulting solution to within a range of from 30° to 40° C., in order to effect precipitation of the calcium sulfate as the dihydrate,
   c. separating said calcium sulfate dihydrate from the solution,
   d. concentrating said solution by evaporating water at a pressure of from 100 to 150 mm. Hg and a temperature ranging from 80° to 90° C., to a $P_2O_5$ content of 50 to 54 percent by weight, and
   e. recycling a fraction of the solution obtained from step (d) to step (a),
   said solution having a final sulfate ion content of below 0.5 percent.
2. The process of claim 1 wherein the final concentration of $P_2O_5$ in step (a) is 35 percent by weight.